Oct. 14, 1952 E. F. SMALL 2,613,882
FISHING REEL
Filed June 8, 1950 2 SHEETS—SHEET 1
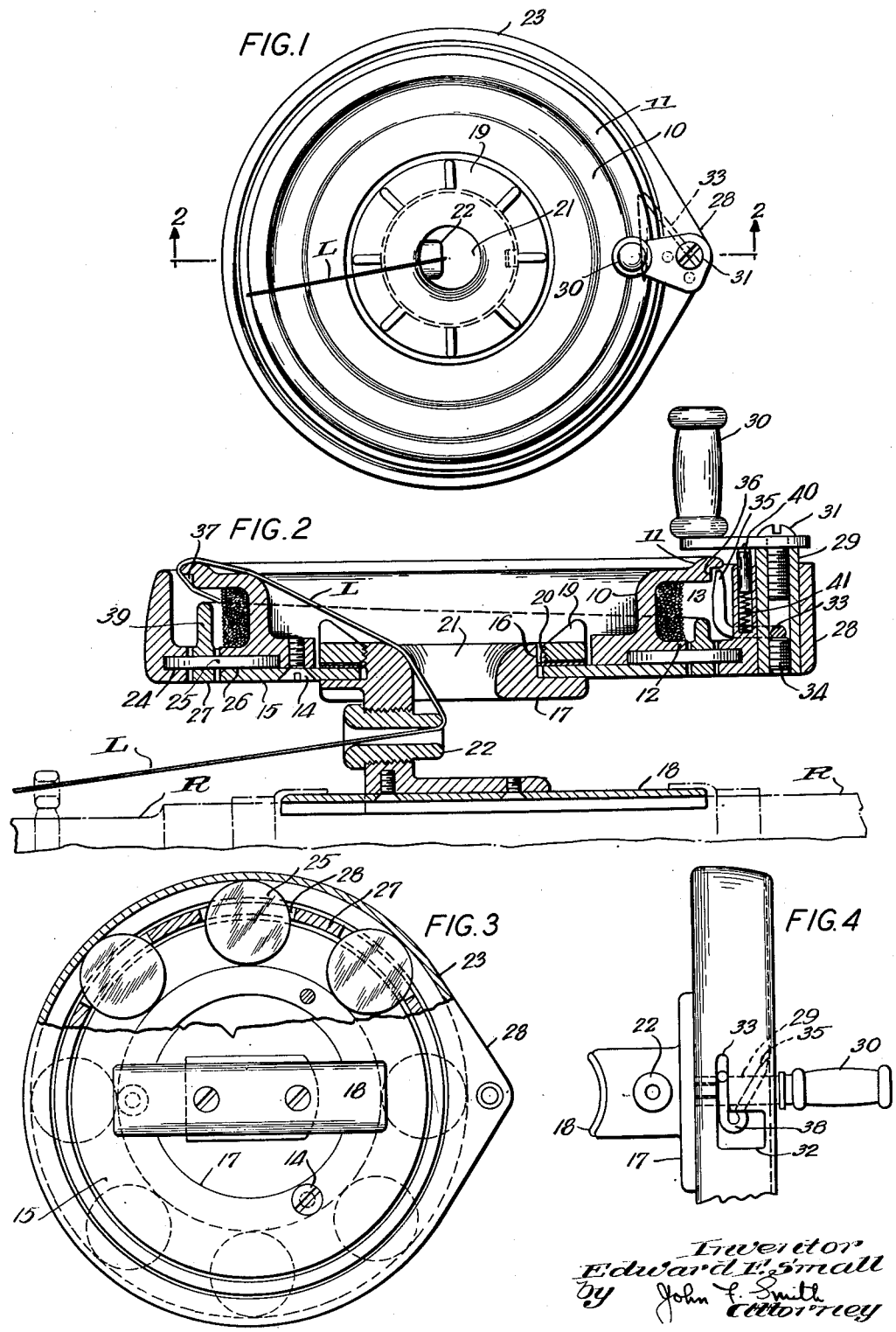
Inventor
Edward F. Small
by John L. Smith
Attorney Oct. 14, 1952 E. F. SMALL 2,613,882
FISHING REEL
Filed June 8, 1950 2 SHEETS—SHEET 2
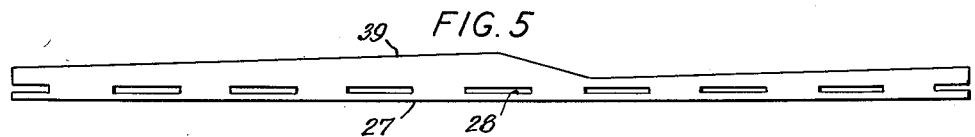
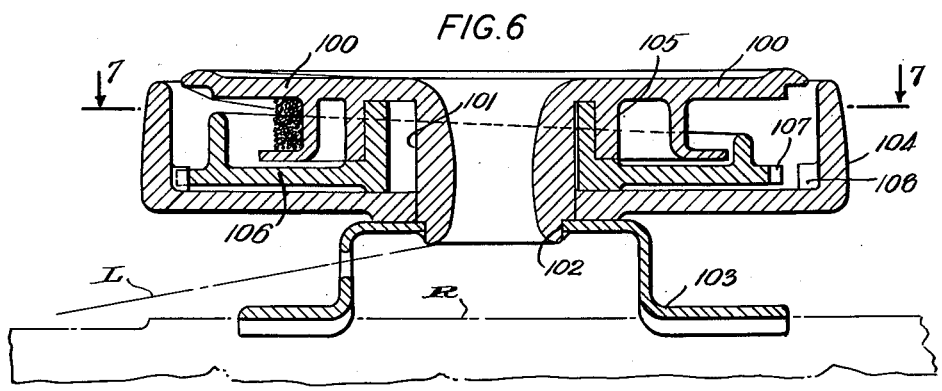
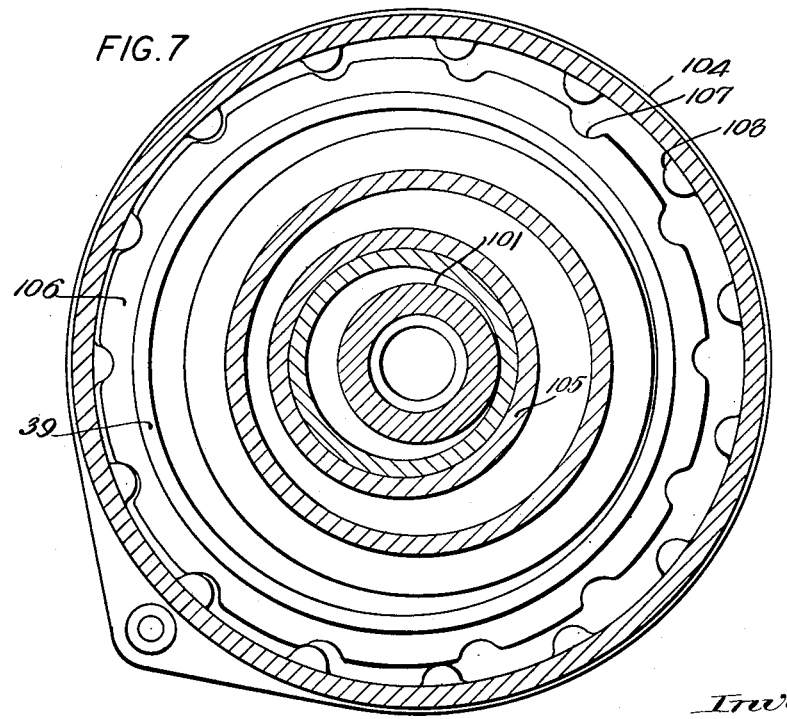
Inventor:
Edward F. Small
by John L. Smith
Attorney.

Patented Oct. 14, 1952

2,613,882

UNITED STATES PATENT OFFICE 2,613,882

FISHING REEL

Edward F. Small, Newton, Mass.

Application June 8, 1950, Serial No. 166,813

8 Claims. (Cl. 242—84.4)

This invention relates to fishing reels and more particularly to a type having a stationary reel or spool upon which a fishing line is wound by a rotatable line winding member; e. g., the reel disclosed in Patent No. 2,514,345, issued July 4, 1950.

An object of my present invention is to provide a fishing spool of the stationary reel type having a simple yet effective device for evenly distributing a line laterally across the spool as it is wound thereabout.

A further object of the invention is to provide a stationary spool fishing reel having a single control member for engaging a line winding finger, rotating the line winding finger, and for causing movement of a line distributing device.

A still further object of this invention is to provide a fishing reel of improved construction, having relatively few moving parts, which is cheap to manufacture, easy to operate, and which can be secured to standard types of fishing rods.

Other objects of the invention will in part be obvious and will in part appear hereinafter.

For a fuller understanding of the nature and objects of the invention reference should be had to the following detailed description taken in connection with the accompanying drawing, in which:

Fig. 1 is a side elevational view of one form of a fishing reel of my invention;

Fig. 2 is a cross sectional view, on an enlarged scale, taken substantially along lines 2—2 of Fig. 1, showing the wind handle in the operative position and showing the reel attached to a standard form of fishing rod;

Fig. 3 is a rear elevational view, partly in section, of the reel shown in Fig. 1;

Fig. 4 is a fragmentary plan view;

Fig. 5 is a development of the cylindrical roller cage and line guiding cam;

Fig. 6 is a sectional view of another form of construction of a reel of my invention; and Fig. 7 is a sectional side elevation taken substantially along lines 7—7 of Fig. 6.

Referring to the drawings and first to Figs. 1 to 5, there is shown a fishing reel comprising a cylindrical member 10 having spaced sidewalls 11 and 12 extending around its periphery so as to form a spool 13 about which a line L may be wound by mechanism hereinafter described. The member 10 is normally stationary and may be secured directly to a fishing rod. However, it is desirable at times while reeling in a fish to allow the reel to slip and preferably the spool member 10 is secured by the screws 14 to a disc 15 having a hole in its central portion which fits over a threaded hub 16 extending from the holder 17 to which a saddle plate 18 is screwed for attaching the complete reel to a standard type of fishing rod R. A nut 19 is threaded to the hub 16 and can be adjusted to press against the spring washer 20 to give any desired friction to hold the spool member normally stationary.

The holder 17 has a passage 21 entirely through its central portion and the line L is fed from the periphery of the spool 13 through the passage 21 to a line guide bushing 22 threaded to the holder and thence to the line guides of the fishing rod.

It can readily be seen that the line L can unwind freely from the spool 13 when casting with a rod to which the reel is attached.

To wind the line L about the spool an annular shaped member 23 surrounds the periphery of the spool 13 and a groove 24 is cut into the inner surface of such annular member which forms an outer raceway for the rollers 25 and the space 26 between the disc 15 and the sidewall 12 of the spool forms the inner raceway for the rollers. The rollers may be made of "nylon" or other hard wearing material. To separate the rollers, and to keep them in an annular series, a cylindrical cage 27 is provided with slots 28 in which the rollers are positioned.

The annular shaped member 23 is provided with an ear 28 which is bored to receive a shaft 29 to which the handle 30 is securely attached by the screw 31. A small opening 32 is formed in the annular member 23 to allow entry of a line wind engaging hook 33 which is held to the shaft 29 by a set screw 34.

The line wind hook 33 is shaped, as shown in Fig. 4, so that its hook end 35 extends into a clearance groove 36 formed on the reel sidewall 11 in order to engage in the space 37 formed by the line L as it leads over the periphery of the spool to pass through the passage 21. The eye portion 38 of the line wind hook is positioned closely adjacent the sidewall 12 of the spool so that as the line L is engaged by the hook, when the annular member 23 is rotated by means of the handle 30, the line will slide down the hook due to tension of the line and will be located and held by the eye portion 38.

To distribute the line L laterally across the spool as it is being wound thereabout, the cylindrical roller cage 27 extends into the space forming the spool 13 and is provided with a uniform rise cam 39 the development of which is shown in Fig. 5. When the annular member 23 is rotated the rollers 25 are frictionally rotated and of course roll around their raceways at a different relative speed than the annular member 23 travels, consequently the cage 27 rotates and since the line L is held against the surface of the cam 39 by the eye portion 38 of the line wind hook the line is distributed evenly across the entire width of the spool.

In order to cast with the reel described, the handle 30 is also used to rotate the shaft 29 to swing the line wind hook 33 from the line wind or operative position to an inoperative position where the hook end 35 is withdrawn from the groove 36 and cannot pick up the line L as it unwinds.

The handle may be locked in either position by the detent 40 which is pressed by the spring 41 into depressions formed in the crank portion of the handle.

In Figs. 6 and 7 another form of construction is shown wherein the spool member 100 is provided with a hub 101 having a portion 102 of reduced diameter which may be riveted or welded to a rod seat plate 103. The outer annular shaped member 104 is journalled on the hub 101 and adapted to be rotated with the same type of handle as earlier described.

An eccentric bearing 105 extends from the spool member 100 and journalled therein is a cam disc 106 having depressions 107 formed on its periphery which engage with teeth 108 formed on the inner diameter of the outer annular member 104. Thus, as the outer member 104 is rotated to wind the line about the spool, the cam disc 106 is rotated at a relatively different speed and, as the line is held against the cam surface by the type of line wind hook previously described, the line is distributed evenly across the width of the spool.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. A fishing reel comprising a normally stationary spool adapted to be secured to a fishing rod, said spool having a passage entirely through its central portion through which a line is fed from the periphery of said spool to the line guides of a fishing rod, a rotatable line engaging member mounted adjacent the periphery of said spool, a rotatable line distributing cam surrounding said spool, and means for rotating said line engaging member to wind a line about said spool and for rotating said line distributing cam at a relatively different speed.

2. A fishing reel comprising a normally stationary spool adapted to be secured to a fishing rod, said spool having a passage entirely through its central portion through which a line is fed from the periphery of said spool to the line guides of a fishing rod, a rotatable line engaging member mounted adjacent the periphery of said spool for movement from an inoperative position to an operative position, a handle for moving said line engaging member to and from said positions and for rotating it to wind a line about said spool, a rotatable line distributing cam surrounding said spool, and means operable during rotation of said line engaging member to rotate said line distributing cam at a relatively different speed.

3. A fishing reel comprising a normally stationary spool adapted to be secured to a fishing rod, said spool having a passage entirely through its central portion through which a line is fed from the periphery of said spool to the line guides of a fishing rod, a rotatable line engaging member mounted adjacent the periphery of said spool for movement from an operative position to an inoperative position, means forming a detent for holding said line engaging member in one of said positions, a handle for moving said line engaging member to and from said positions and for rotating it to wind a line about said spool, a rotatable line distributing cam surrounding said spool, and means operable during rotation of said line engaging member to rotate said line distributing cam at a relatively different speed.

4. A fishing reel comprising a normally stationary spool adapted to be secured to a fishing rod, said spool having a passage formed entirely through its central portion through which a line is fed from the periphery of said spool to the line guides of a fishing rod, a rotatable annular shaped member surrounding said spool, a line engaging member carried by said annular member for winding a line about said spool, said line engaging member being moveable from an operative position to an inoperative position, a rotatable cam for laterally distributing a line wound upon said spool, said cam being arranged to entirely surround said spool, and a single handle for moving said line engaging member, for rotating said annular member, and for rotating said cam.

5. A fishing reel comprising a normally stationary spool member adapted to be secured to a fishing rod, said spool member having a passage entirely through its central portion through which a line is fed from the periphery of said spool to the line guides of a fishing rod, an annular shaped member surrounding the periphery of said spool member and spaced therefrom, means forming a raceway in said spool member, means forming a raceway in the inner surface of said annular member, an annular series of rollers in said raceways, a cylindrical cage for spacing said rollers, said cage extending through the space between said spool and said annular member and having a cam shape on its end face to contact a line wound about said spool, a line engaging member mounted on said annular member, and means for rotating said annular member and consequently said cage member to cause said line engaging member to wind a line about said spool and said cam shape to distribute said line laterally across said spool as it is wound thereabout.

6. A fishing reel comprising a normally stationary spool adapted to be secured to a fishing rod, said spool having a passage through its central portion through which a line is fed from the periphery of said spool to the line guides of a fishing rod, an annular member surrounding said spool and spaced therefrom, means journalling said annular member for rotation, a cylindrical member having a cam on its end face which extends into the space between said spool and said annular member, means journalling said cylindrical member for rotation, a line engaging hook mounted on said annular member, means for rotating said annular member to cause said line engaging hook to engage a line leading from the periphery of said spool to wind it thereabout and to tension the line against said cam, and means gearing said cylindrical member to said annular member to rotate said cam at a relatively different speed whereby said cam will distribute the line laterally across said spool.

7. A fishing reel comprising a holder adapted to be secured to a fishing rod, a spool member rotatably mounted on said holder, frictional means acting to restrain rotation of said spool member, said spool member having a passage through its central portion through which a line is fed from the periphery of the spool to line guides of a fishing rod, an annular shaped member surrounding the periphery of said spool member and spaced therefrom, means forming a raceway in said spool member, means forming a raceway in the inner surface of said annular member, an annular series of rollers in said raceways, a cylindrical cage for spacing said rollers, said cage extending through the space between said spool and said annular member and having a cam shape on its end face to contact a line wound about said spool, a line engaging member mounted on said annular member, and means for rotating said annular member and consequently said cage member to cause said line engaging member to wind a line about said spool and said cam shape to distribute said line laterally across said spool as it is wound thereabout.

8. A fishing reel comprising a holder adapted to be secured to a fishing rod, a spool member rotatably mounted on said holder, frictional means acting to restrain rotation of said spool member, said spool member having a passage through its central portion through which a line is fed from the periphery of the spool to line guides of a fishing rod, an annular member surrounding said spool and spaced therefrom, means journalling said annular member for rotation, a cylindrical member having a cam on its end face which extends into the space between said spool and said annular member, means journalling said cylindrical member for rotation, a line engaging hook mounted on said annular member, means for rotating said annular member to cause said line engaging hook to engage a line leading from the periphery of said spool to wind it thereabout and to tension the line against said cam, and means gearing said cylindrical member to said annular member to rotate said cam at a relatively different speed whereby said cam will distribute the line laterally across said spool.

EDWARD F. SMALL.

REFERENCES CITED

The following references are of record in the file of this patent:

UNITED STATES PATENTS

| Number | Name | Date |
|---|---|---|
| 1,269,466 | Lemassena | June 11, 1918 |
| 2,229,470 | Pezon | Jan. 21, 1941 |
| 2,439,298 | Horan | Apr. 6, 1948 |
| 2,514,345 | Small | July 4, 1950 |

FOREIGN PATENTS

| Number | Country | Date |
|---|---|---|
| 619,459 | Great Britain | Mar. 9, 1949 |
| 804,067 | France | July 27, 1936 |